(12) United States Patent
Tian (10) Patent No.: US 6,968,072 B1
(45) Date of Patent: Nov. 22, 2005

(54) IMAGE SENSOR WITH BUILT-IN STEGANOGRAPHIC AND WATERMARKING FUNCTIONS

(75) Inventor: Hui Tian, Mountain View, CA (US)

(73) Assignee: PIXIM, Inc., Mountain View, CA (US)

(*) Notice: Subject to any disclaimer, the term of this patent is extended or adjusted under 35 U.S.C. 154(b) by 719 days.

(21) Appl. No.: 10/006,302

(22) Filed: Dec. 6, 2001

(51) Int. Cl.$^7$ .............................................. G06K 9/00
(52) U.S. Cl. ...................... 382/100; 382/232; 713/176; 348/460
(58) Field of Search ................................ 382/100, 232; 380/210, 252, 287, 54; 713/176; 704/200.1, 704/273; 381/73.1; 348/460, 463

(56) References Cited

U.S. PATENT DOCUMENTS

| | | | |
|---|---|---|---|
| 6,215,421 B1 * | 4/2001 | Kondo et al. ................ | 341/50 |
| 6,396,539 B1 * | 5/2002 | Heller et al. ................ | 348/246 |
| 6,501,397 B1 * | 12/2002 | Radha et al. ................ | 341/60 |
| 6,580,804 B1 * | 6/2003 | Abe ............................ | 382/100 |
| 6,650,782 B1 * | 11/2003 | Joshi et al. ................. | 382/239 |
| 6,680,748 B1 * | 1/2004 | Monti ........................ | 348/220.1 |
| 2002/0031241 A1 * | 3/2002 | Kawaguchi et al. ........ | 382/100 |
| 2002/0051559 A1 * | 5/2002 | Noda et al. ................. | 382/100 |
| 2003/0081809 A1 * | 5/2003 | Fridrich et al. ............ | 382/100 |

* cited by examiner

Primary Examiner—Samir Ahmed
Assistant Examiner—Anand Bhatnagar
(74) Attorney, Agent, or Firm—Carmen C. Cook; Patent Law Group LLP (57) ABSTRACT

An image sensor enabling automatic steganography is disclosed herein. One embodiment of such a sensor includes a single integrated system fabricated on a single substrate. In particular, the image sensor can include a digital pixel sensor; supporting circuitry, image modification circuitry, and memory all formed on a single chip. Also disclosed is a method for using steganography to hide information in images. The method comprises providing image data configured as a plurality of bit planes and providing information for insertion into the image and preparing that information for insertion into an image. A suitable bit plane is selected from among the plurality of bit planes and the information sought to be hidden is inserted into the image creating a steganographic image.

16 Claims, 10 Drawing Sheets

IMAGE SENSOR WITH BUILT-IN STEGANOGRAPHIC AND WATERMARKING FUNCTIONS

TECHNICAL FIELD

The invention described herein relates to apparatus and methods for steganographically storing information in image data. In particular, embodiments of the invention relate to image sensors having built-in steganographic functions.

BACKGROUND

Steganography is the art and science of communicating in a way which hides the existence of the communication. This is in contrast to cryptography in which a third party may detect a message but presumably can not decipher it. The goal of steganography is to hide messages inside otherwise innocuous messages in such a way that the message reader is not even aware that a second secret message is present.

It is a sad fact that certain individuals and entities commonly reproduce the work of others and then sell the copies. Such piracy costs many industries and individuals millions of dollars of lost profits due to their inability to detect or trace such piracy. An advantageous aspect of the invention facilitates protection of such materials. For example, an image can be protected from potential piracy or other unauthorized use by inserting a traceable image into the image. In one example, it may be desirable to insert a certain trademark image into an image. The trademark image is inserted such that it is not visible by ordinary users and does not significantly degrade visual image quality, but if one has an appropriate decoding method, the trademark image can be located and viewed. Such methods are often referred to as "watermarking" or "fingerprinting". Such techniques are useful in combating piracy of protected materials. Current methods and apparatus used for accomplishing such watermarking (as well as steganography in general) are time intensive and require expensive software.

There is a need for apparatus and methods for automatically accomplishing steganography without seriously degrading image quality. Method and apparatus embodiments constructed in accordance with the principles of the present invention are intended to solve these and other problems.

SUMMARY OF THE INVENTION

In accordance with the principles of the present invention, the embodiments of the present invention include apparatus and methods for hiding information in images.

One method embodiment comprises providing information sought to be hidden and preparing that information for insertion into an image. The method further includes providing an image configured as a plurality of bit planes. A suitable bit plane is selected from among the plurality of bit planes and the information sought to be hidden is inserted into the selected bit plane of the image. The result is a steganographically enhanced image. In one example, the information sought to be hidden is a watermark or a fingerprint.

Another method embodiment includes providing an image sensor having a digital pixel sensor, supporting circuitry, image modification circuitry, and memory all formed on a single chip. The method includes providing an original image via the image sensor, the original image configured as a plurality of bit planes. The method includes providing information sought to be hidden and preparing that information for insertion into the original image. A suitable bit plane is selected for the insertion of the prepared information. The prepared information is then inserted into the selected bit plane of the original image. In one example, the prepared information sought to be hidden is a watermark or a fingerprint.

Another aspect of the invention is embodied in a single-chip digital image sensor that includes the following: a digital sensor array including a plurality of light sensitive digital pixel sensors which output digital values corresponding to an image of a scene. The sensor includes at least one memory for storing the digital values provided by the digital sensor array as a plurality of bit planes and for storing digital information sought to be inserted into the image. The sensor also includes image modification circuitry that accesses from memory, one or more bit planes corresponding and also accesses the digital information sought to be inserted into the image. The image modification circuitry analyzes the one or more of the bit planes to determine a suitable bit plane for inserting the information sought to be inserted. Once a suitable bit plane is ascertained, the information is inserted into the suitable bit plane to form a steganographically enhanced image.

Other aspects and advantages of the invention will become apparent from the following detailed description and accompanying drawings which illustrate, by way of example, the principles of the invention.

BRIEF DESCRIPTION OF THE DRAWINGS

The following detailed description of the embodiments of the invention will be more readily understood in conjunction with the accompanying drawings, in which.

It is to be understood that in the drawings like reference numerals designate like structural elements.

DETAILED DESCRIPTION OF THE DRAWINGS

A digital image sensor enabling automatic steganography is disclosed herein. The digital image sensor provides steganography by hiding information in digital images. Moreover, methods of enabling such steganography are also disclosed. Disclosed is a digital imaging device that integrates a digital pixel sensor, read-out circuitry, memory, and image modification circuitry all on a single chip (so-called system-on-a-chip (SOC) technology). By implementing method embodiments disclosed hereinbelow on such a chip, certain advantages specific to SOC are realized.

The embodiments described below provide methods for hiding information in digital images. Particular embodiments provide methods and apparatus for concealing "watermarks" in digital images, thereby providing undetectable copyright protection for the digital images. Additionally, such methods and apparatus can be used to hide encoded and/or encrypted information in digital images. By inserting such information into images, the images can be used to transmit hidden information under the guise of ordinary digital images.

As alluded to previously, embodiments of the present invention include methods and apparatus for automatically implementing steganography using a single image sensor chip. One such chip is described using the block diagram of FIG. 1B. Other aspects of the invention are presented largely in terms of procedures, steps, logic blocks, processing, and other symbolic representations that directly or indirectly resemble the operations of devices in one embodiment. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1A:
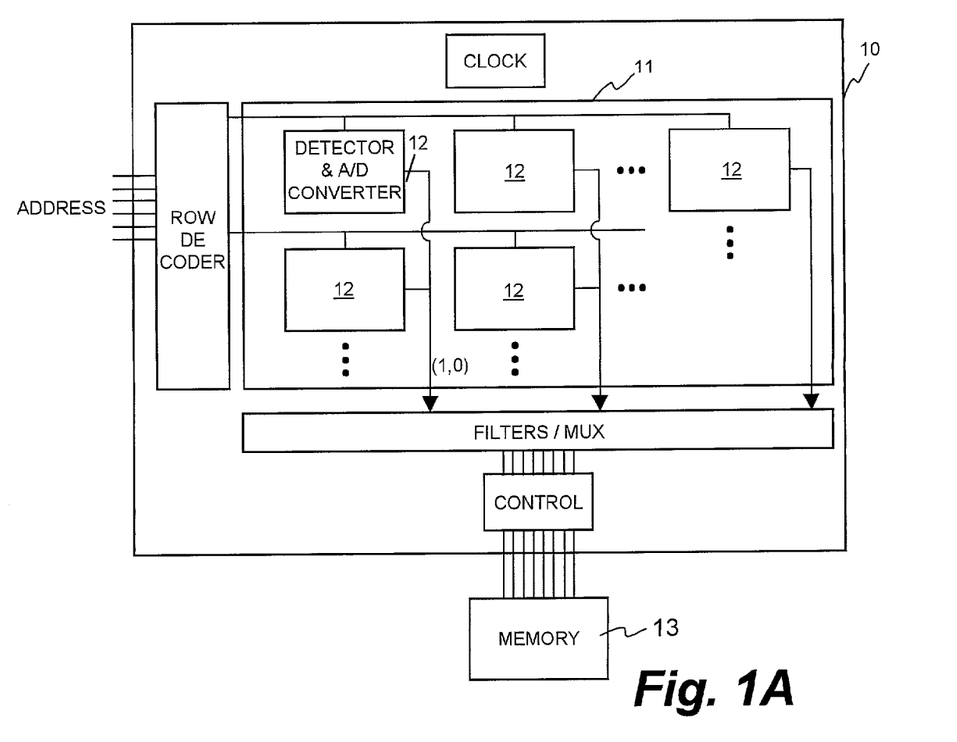
FIG. 1A is a schematic diagram that shows in simplified form a system-on-a-chip embodiment that can be used to perform steganography in accordance with one embodiment of the present invention.

FIG. 1A illustrates a digital pixel sensor architecture which may be used to practice one embodiment of the present invention. In FIG. 1A, image sensor 10 is referred to herein as a digital pixel sensor (DPS) which provides a digital output signal at each pixel element 12 representing the light intensity detected by that pixel element. The combination of a photodetector and an analog-to-digital (A/D) converter in an area image sensor helps enhance detection accuracy and reduce power consumption, and improves overall system performance. Such a DPS is described in greater detail in U.S. Pat. No. 5,461,425 entitled "CMOS Image Sensor with Pixel Level A/D Conversion", issued Oct. 24, 1995, by Fowler et al., which is hereby incorporated by reference.

In the present description, a digital pixel sensor (DPS) array or a sensor array refers to a digital image sensor having an array of photodetectors where each photodetector produces a digital output signal. The pixels of a DPS array are sometimes referred to as a "sensor pixel" or a "sensor element" or a "digital pixel," which terms are used to indicate that each of the photodetectors 12 of a DPS array 11 includes an analog-to-digital conversion (ADC) circuit, and is distinguishable from a conventional photodetector which includes a photodetector and produces an analog signal. The digital output signals of a DPS array have advantages over the conventional analog signals in that the digital signals can be read out at a much higher speed. Of course, other schemes for implementing a pixel level A/D conversion in an area image sensor may also be used in the image sensor of the present invention.

In the digital pixel sensor architecture shown in FIG. 1A, a dedicated ADC scheme is used. That is, each pixel element 12 in sensor array 11 includes an ADC circuit. The imaging methods of the present invention can also be practiced in other DPS architectures, including a shared ADC scheme. In the shared ADC scheme, instead of providing a dedicated ADC circuit to each photodetector in a sensor array, an ADC circuit is shared among a group of neighboring photodetectors.

Co-pending and commonly assigned U.S. patent application Ser. No. 09/567,638, entitled "Integrated Digital Pixel Sensor Having a Sensing Area and a Digital Memory Area" of David Yang et al., which is hereby incorporated by reference, describes an integrated DPS sensor with an on-chip memory for storing at least one frame of pixel data. The incorporation of an on-chip memory in a DPS sensor alleviates the data transmission bottleneck problem associated with the use of an off-chip memory for storage of the pixel data. In particular, the integration of a memory with a DPS sensor makes feasible the use of multiple sampling for improving the quality of the captured images. Multiple sampling is a technique capable of achieving a wide dynamic range without many of the disadvantages associated with other dynamic range enhancement techniques, such as degradation in signal-to-noise ratio and increased implementation complexity. The aforementioned patent application is incorporated herein by reference in its entirety.

Figure 1B:
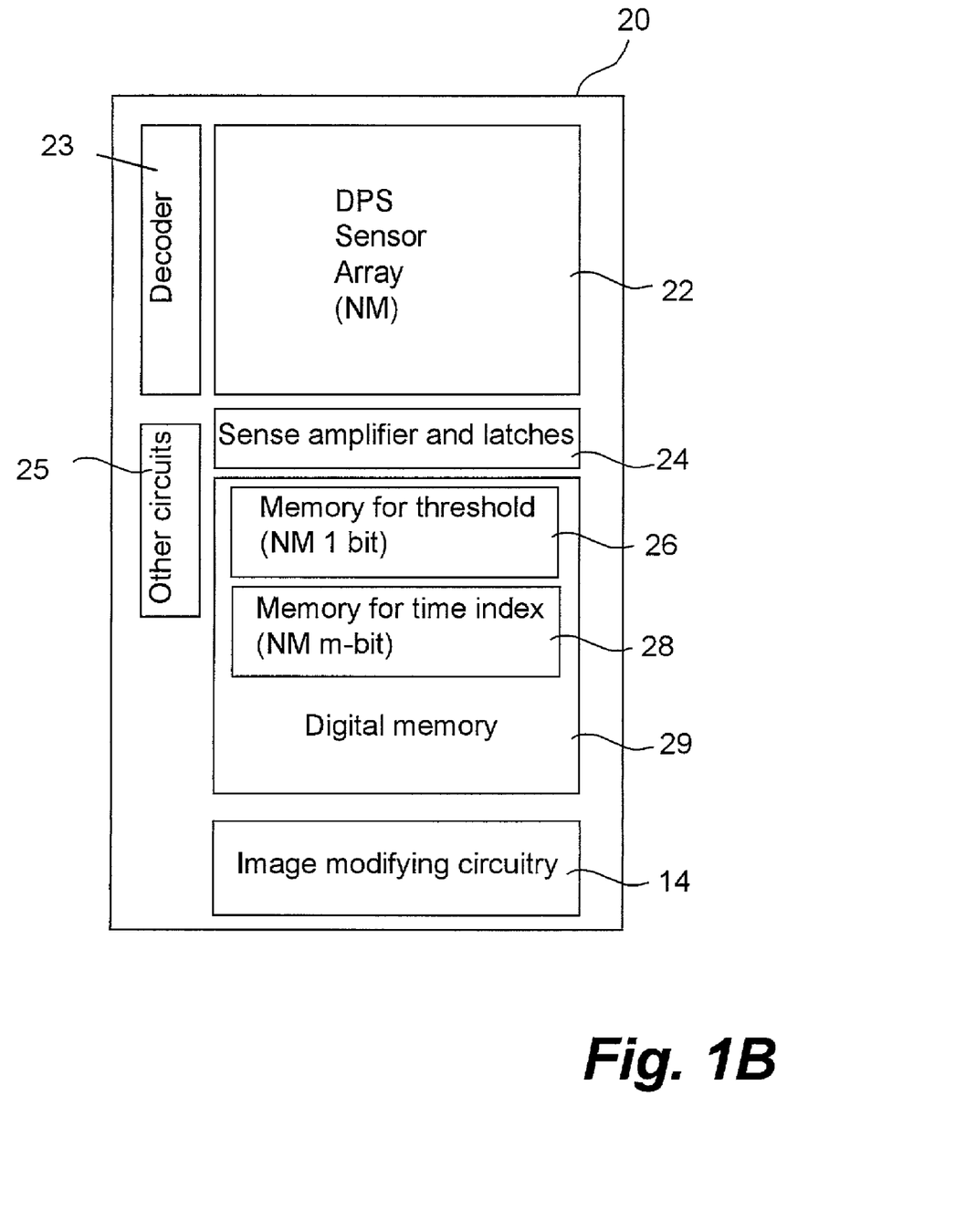
FIG. 1B is a schematic diagram that shows in simplified form a system-on-a-chip embodiment that can be used to perform steganography in accordance with one embodiment of the present invention.

FIG. 1B is a block diagram of an embodiment of an image sensor including data memory having partitioned threshold memory and time index memory. These memory components, the digital pixel sensor, decoders, and other components or circuits can be integrated on the same substrate in accordance with embodiments of the present invention.

FIG. 1B depicts an image sensor 20 based on a digital pixel sensor 22 according to one embodiment of the invention. The digital pixel sensor 22 may be implemented according to U.S. Pat. No. 5,461,425 or U.S. Pat. No. 5,801,657, and outputs digital signals representing one or more images of a scene. A sense amplifier and latches 24 are coupled to the digital pixel sensor 22 to facilitate read out of digital signals from the digital pixel sensor 22. Unlike some known systems, an image sensor 20 in accordance with the invention also includes an on-chip memory that includes a memory 26 (referred to herein as a threshold memory) for storing threshold values, a memory 28 (referred to herein as a time index memory) for storing time index values, and a digital or data memory 29 that is large enough to accommodate a frame of image data from sensor 22. Embodiments can include decoder circuitry 23, image modification circuitry (described in greater detail herein) 14, and/or a variety of other circuitry 25.

According to one embodiment of the invention, sensor 22 is of N by M pixels and has k-bits. Thus, the size of the threshold memory 26 is of N by M bits, and the size of the time index memory 28 is of N by M by m bits, where m is the time resolution. The presently preferred pixel resolution of sensor 22 is 1000 by 1000 in 10 bits. Thus, the threshold memory 26 is a one-megabit memory, the time index memory 28 is a two-megabit memory when the time index is set to be T, 2T, 4T and 8T (i.e. two-bit resolution), and the digital memory 29 preferably has a size of at least 1.2 megabytes. Using such a memory configuration, each of the pixel elements in the sensor 22 can be timely stamped by each of the memory cells in the threshold memory 26, the time index memory 28, and the data memory 29.

Figure 1C:
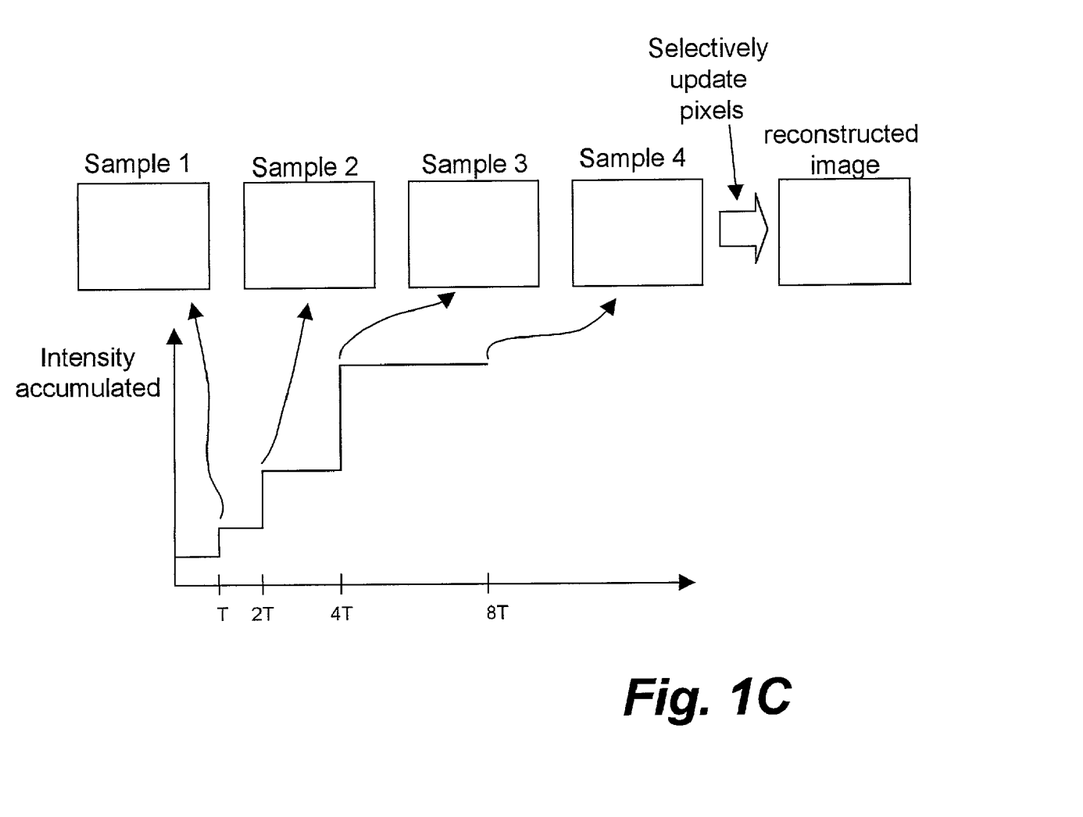
FIG. 1C is a graphic diagram that shows a time indexed exposure of an image sensor in accordance with one embodiment of the present invention at different times.

In operation, at each of the time indexes, for example, T, 2T, 4T and 8T, the sensor 22 is exposed to a target multiple (e.g. four) times, resulting in four images at four different exposure times. FIG. 1C shows an example of the multiple exposures. As shown in FIG. 1C, frame 1 is created after time T, frame 2 is created after time 2T, frame 3 is created after time 4T, and frame 4 is created after time 8T. One of the advantages of having multiple images of the same target is the ability to expand the dynamic range of the image thus captured. Because of the relatively short exposure time, frame 1 typically captures information that is related to high illumination areas in the target. Likewise, because of the relatively long exposure time, frame 4 typically captures information that is related to low illumination areas in the target. Frame 2 and frame 3 thus capture information that is related to gradually increased illumination areas in the target. As a result, the combination of the multiple images provides a very wide dynamic range.

Generally, each of the frames is read out to a memory so that subsequent processing to combine the frames is possible. The architecture illustrated on FIG. 1A shows that the image data are read out to a memory 13 through a plurality of lines (e.g. pins of sensor 10). Given the exposure times, the generated image data must be read out fast enough so that it does not affect the following frame. As is well known, the number of lines is limited to a practical packaging solution and often far less than what is needed to accommodate the required speed. Therefore, the limited number of the lines becomes a bottleneck for data transmission from the sensors 12 to the memory 13.

Referring to FIG. 1B, one of features of the depicted embodiment is to place an on-chip memory in the image sensor 20, shown as the data memory 29. Thus, there is no bottleneck for data transmission from the sensors 22 to the memory 29. In operation, after one exposure time, a frame of data can be immediately read out to the memory 29. Additionally, in the depicted SOC architecture, much of the required digital processing circuitry is formed on a single substrate. Conventional architectures locate memory, A/D convertors, and other circuitry on chips other than the sensor chip (See, FIG. 1A). Thus, in order to obtain digital signals in present architectures, the analog sensor signals must be routed from the sensor chip to off-chip A/D convertors where they are converted into digital signals and then routed to off-chip memory and signal processing devices. Such architectures are constrained by space limitations that limit the number of connections possible. Also, such conventional systems have slower processing times. These limitations cause time and space "bottlenecks" which the embodiments of the invention seek to overcome. The present invention sensor embodiments include memory, A/D conversion circuitry, and other circuitry located directly on the same chip as the sensor. As a result, the time and space "bottlenecks" of conventional system architectures are eliminated. Thus, in the depicted embodiments digital signals are produced directly by the pixel sensors.

According to one aspect of the invention, after the first frame of data is read out into the memory 29, the second frame of data is selectively read out into the memory 29 to improve, update, or enhance the pixel values contained therein. Selection is controlled by the contents of the corresponding threshold memory 26. The detailed operation of the image sensor may be provided in co-pending and commonly assigned U.S. application Ser. No. 09/585,595.

To address the need for image sensors that can perform steganography, the memory circuits 26, 28, 29 and the image modification circuitry 14 are formed directly onto the same substrate as the digital sensor array 11. In other words, the image sensor 100 is a single integrated circuit (single chip) which includes at least the digital sensor array 11, the memory circuits 26, 28, 29, and the image modification circuitry 14. Such an SOC architecture is advantageous because it increases processing speeds by integrating all components on a single substrate. Moreover, such architecture facilitates automatic steganography by using integrated electronic components that accomplish needed processing at the hardware level rather than requiring the addition of software. Although not confined to hardware only systems, the preferred embodiments of the invention accomplish all steganograhic processing using hardware level components. Also, because single chip fabrication is less expensive than multi-chip multi-component devices, SOC architecture is less expensive to construct. However, in the alternative, two CMOS substrates may be formed, one for the sensor 11 and the other for sensor supporting circuitry including the memory structures 26, 28, 29 and image modification circuitry 14. Through a bonding process, a stacked or sandwiched image sensor can be formed.

Figure 2:
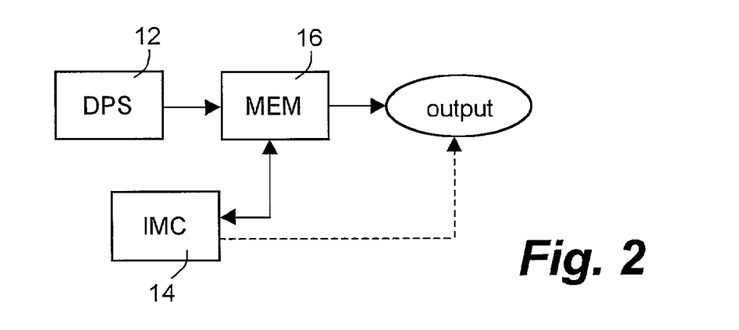
FIG. 2 is a block diagram of a system embodiment that can be used to perform steganography in accordance with one embodiment of the present invention.

FIG. 2 illustrates a simplified block diagram showing the relationship between the various components on the chip. The image sensor 11 (also referred to herein as a digital pixel sensor (DPS)) provides image information to the memory 16 (MEM) which provides and receives data from image modification circuitry 14 (IMC). Both modified and unmodified images can be output from the MEM 16. Alternative embodiments can output modified images containing steganographically enhanced images directly from the IMC 14 (as shown by the dashed arrow).

Figure 3:
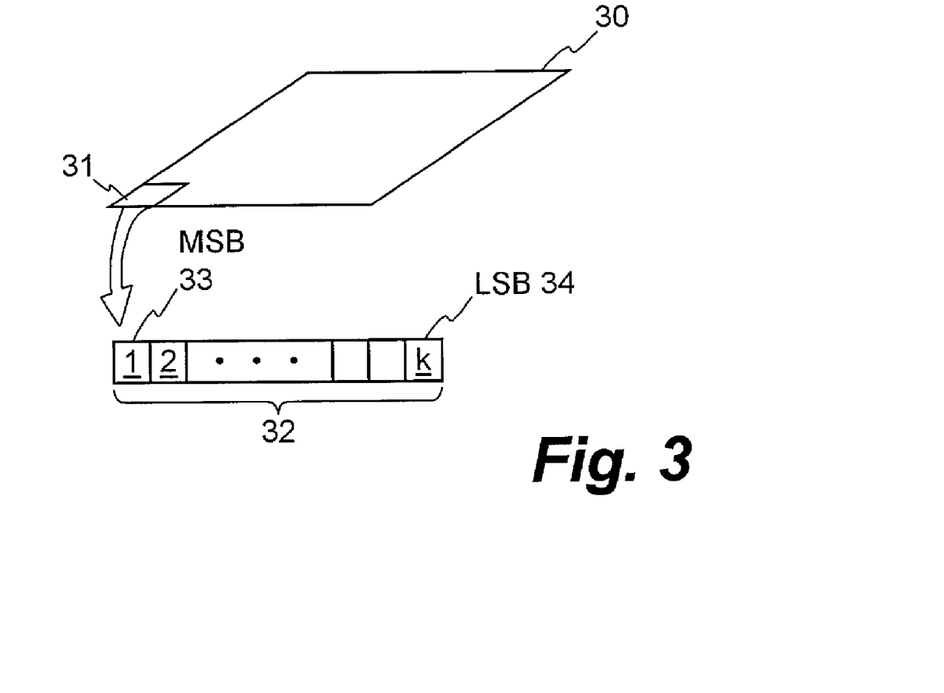
FIG. 3 depicts an image and one example of a bitstream used to define one pixel in the image in accordance with one embodiment of the present invention.

A method embodiment that can be used in conjunction with the image sensor described hereinabove will now be described. FIG. 3 illustrates a digital image 30 of the type that can be captured with image sensors. Typically such images 30 are comprised of thousands (or even millions) of pixels 31. Such pixels 31 can correspond to the pixel sensors 12 shown, for example, in FIG. 1A. Each pixel 31 produces a signal comprising a series of digital bits which define the characteristics of that pixel 31. For example, the digital output of a single pixel 31 can be represented by a bitstream 32. The bitstream 32 includes k bits depicted here as numbered from 1 to k. In the depicted bitstream 32, the first bit 33 is the most significant bit (MSB), and the last bit in the stream is defined as the least significant bit (LSB) 34. The information contained in each pixel can be complex or very simple. For example, each series of bits can contain information concerning pixel luminance, chromaticity, or other optical characteristics. Moreover, each pixel can be defined by any number of bits. One common format encodes pixel information using 8-bit resolution. In one example, an 8-bit gray code format is used to describe each pixel 31.

Conventional approaches read each image using a "raster scan" approach where the entire bitstream 32 for each pixel 31 is read one pixel after another. In accordance with embodiments of the invention, data can be read in another way. Each pixel 31 of an image 30 is defined by a digital bitstream 32 having k bits. Such images 30 can be processed as a series of k bit planes one bit deep. Therefore, instead of raster scanning the entire image 30, the image can be read as a series of k bit planes one bit deep.

Figure 4:
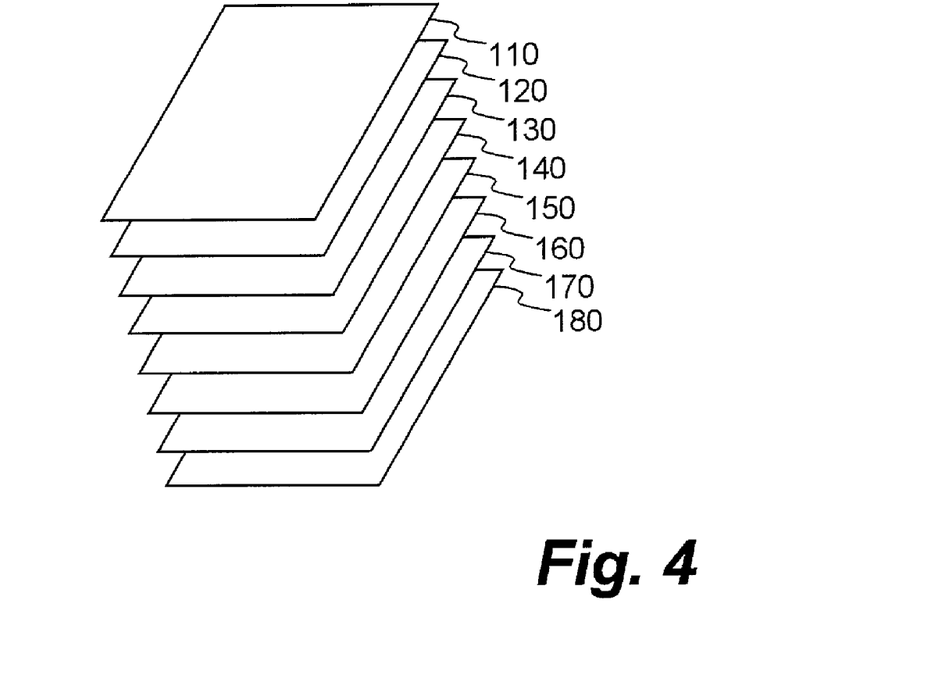
FIG. 4 figuratively depicts an image broken down into a plurality of bit planes in accordance with one embodiment of the present invention.

FIG. 4 depicts an image configured as a plurality of bit planes (110–180). Bit plane 110 represents a first bit plane which is defined by the MSB of each pixel in the image. Bit plane 120 defines a second bit plane which includes the second bit of each pixel in the image. Bit plane 130 describes a third bit plane, and so on. Bit plane 180 is the $k^{th}$ (and least significant) bit plane. Where an image is defined using 8-bit logic, the image can be defined using 8-bit planes (shown here as bit planes 110–180). Bit plane 110 defines the most significant bit plane which includes the MSB from each pixel in the image. The second bit plane, 120, includes the second bit from each pixel in the image, and so on, until the $k^{th}$ bit plane is reached. The $k^{th}$ bit plane includes the $k^{th}$ bit from each pixel in the image. Here, the $k^{th}$ bit is defined by the eighth bit plane 180, which includes the LSB of each pixel in the image.

When images are configured as a plurality of bit planes, for example, as shown in FIG. 4, different steganographic methods can be used to hide information in the images. Such information can be hidden in one or more bit planes of an image. Hidden information can include, but is not limited to: messages, data, or even other images. Methods for accomplishing this typically begin by choosing which information the user seeks to insert into an original image. That information is then encoded into a format which is compatible with the image format of the original image and, if desired, the information is encrypted using any of a number of encryption methods known to one having ordinary skill in the art. Such encryption is especially useful when the information sought to be hidden is, for example, a coded message.

The purpose of such steganographic methods is to add information to images in a fashion such that a viewer of image is not aware that the added information has been inserted into the image. One particularly advantageous application of this principle is the insertion of data into an image that serves to copyright protect the image. One example of such copyright protection can be the introduction of an identifier (for example, trademark symbol, corporate logos, or icons) into an image in such a manner that the image can be viewed without the viewer knowing that the copyright protection information has been introduced to the picture. Such techniques are known as "watermarking" or "fingerprinting" an image. Such watermarks serve a valuable purpose in providing a method of detecting piracy of protected materials. Such techniques can also apply to video content.

Figure 5:
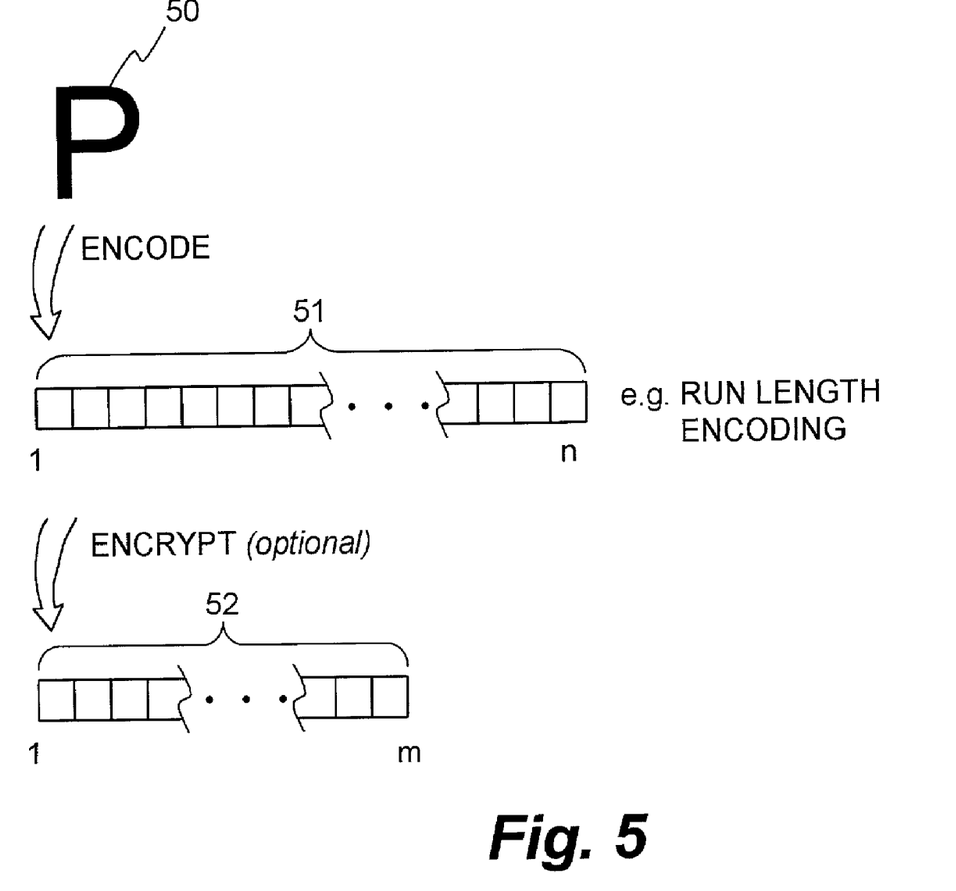
FIG. 5 is a simplified illustration of a process of preparing a watermark for insertion into an image in accordance with one embodiment of the present invention.

FIG. 5 schematically depicts an approach for providing a piece of information and preparing it for introduction into an image. Here, the piece of information sought to be introduced is a watermark image for copyright protection purposes. The information sought to be inserted 50 is encoded in a format that is compatible with the image into which it is to be inserted. Suitable formats include, but are not limited to, gif (graphics interchange format), tiff (tagged image file format), and bitmap formats. For example, the depicted symbol 50 will be inserted into an image as a watermark. The symbol 50 is encoded into a bitstream 51 having from 1 to n data bits. This piece of information is now ready for steganographic insertion into an image to create a steganographically enhanced image. However, the bitstream 51 can be further encrypted (or scrambled) to further conceal the information. Although watermark information can be encrypted, such encryption is particularly useful when used to hide coded messages in an image. Such encryption can be conducted using any of the methods and apparatus known to one having ordinary skill in the art. Such encryption forms an encrypted bitstream 52 having from 1 to m data bits. This encoded bitstream 51 (or the encoded and encrypted bitstream 52) can then be stored to memory where it can be output at the appropriate time for insertion into an image.

Figure 6:
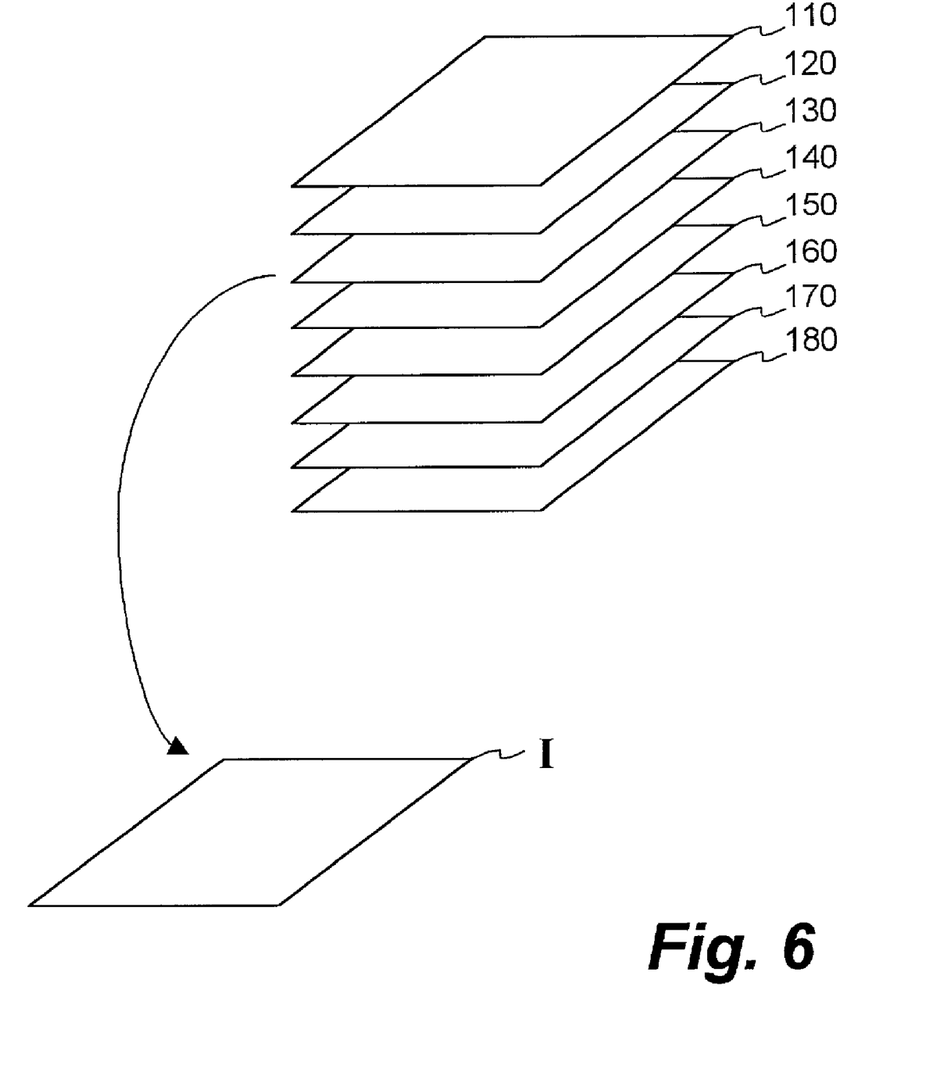
FIG. 6 is a simplified depiction of selecting a bit plane from among the plurality of bit planes in accordance with one embodiment of the present invention.

In addition to preparing and storing the information sought to be inserted into an image, an appropriate insertion site must be found within an image to insert the information. This begins by selecting a suitable initial bit plane from the plurality of bit planes. Referring to FIG. 6, an image having eight bit planes (110–180) is provided. An initial bit plane I is selected. Many methods can be used to select the initial bit plane. However, neither the most significant bit plane 110 nor the least significant bit plane 180 should normally be chosen as the initial bit plane. In the case of the most significant bit plane 110, insertion of the information into that bit plane will likely result in distortions of the image that are relatively easy to detect. In the case of the least significant bit plane 180, the level of noise present in the bit plane 180 makes it an unsuitable location for inserting information. Experience has shown that the first three bit planes (110, 120, 130) commonly result in image distortions that are easily detectable and are, therefore, normally undesirable initial bit planes. Therefore, bit planes 4 through 7 (140, 150, 160, 170) are often more preferred initial bit planes.

Figure 7:
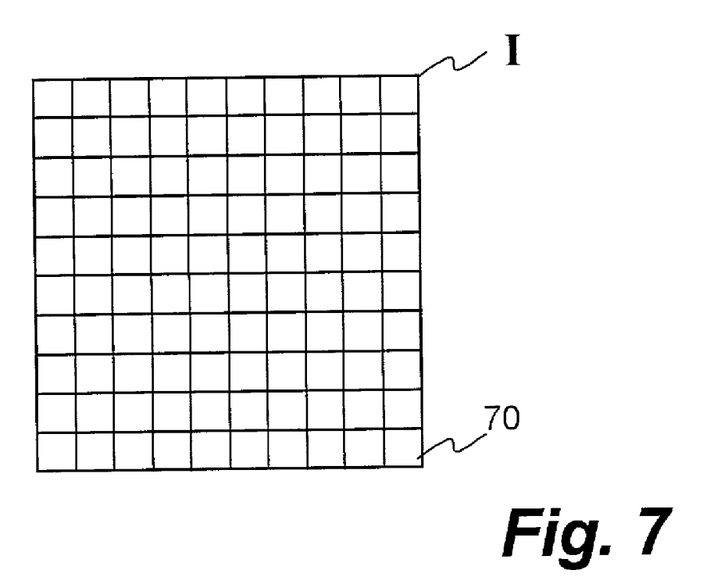
FIG. 7 is a simplified illustration of a bit plane embodiment segregated into a plurality of pixel blocks that can be used in accordance with one embodiment of the present invention.

Once the initial bit plane "I" has been chosen, it must be analyzed to determine a suitable site for insertion of the information sought to be inserted. Additionally, once the information is inserted into the image "I", the resulting image must also be analyzed to determine whether the resulting image has hidden the information to an acceptable degree. Referring to FIG. 7, the initial bit plane "I" is divided into a series of blocks 70. Each of these blocks 70 includes a plurality of data bits. Each data bit corresponds to a pixel. The data bits chosen are defined by the bit plane. For example, if a fourth bit plane is chosen, each data bit is a fourth data bit of the corresponding pixel. The blocks 70 can include any number of pixels. In one embodiment, a block of 64 pixels (an 8 pixel by 8 pixel block) is used. Each bit plane is divided in a similar fashion, having the same number of blocks defining the same number of pixels, with each bit plane defining a different pixel bit. Each block is then analyzed to determine whether or not it provides a satisfactory site for the insertion of the information sought to be inserted. Numerous criteria can be used to analyze each block to determine its suitability for receiving an inserted piece of information. One particularly useful characteristic of a suitable block is that the data bits contained therein are sufficiently randomized in their distribution. One approach for discerning whether a block is suitable for the introduction of a piece of information is described in detail hereinbelow.

Figure 8:
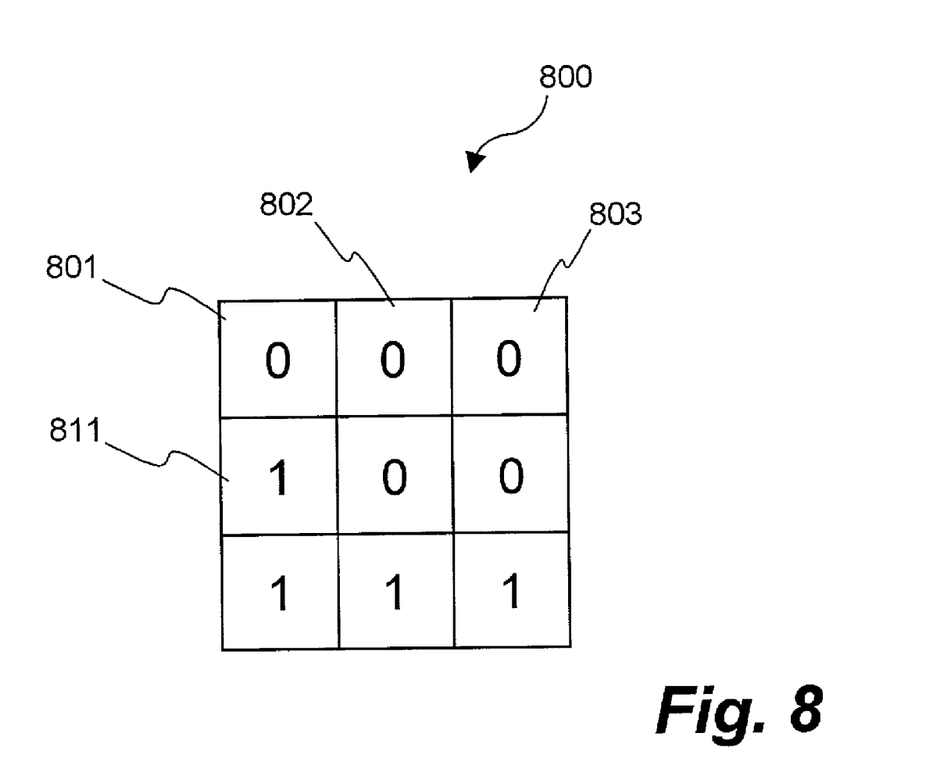
FIG. 8 is a simplified illustration of a single 3×3 pixel block.

Although 8 pixel by 8 pixel blocks of a bit plane provide a satisfactory block for analysis, the principles of one embodiment of the present invention will be illustrated with respect to FIG. 8 and a simplified 3-pixel by 3-pixel block 800 depicted therein. One algorithm that can provide some measure of the suitability of a block is described as follows. The data values of each pixel in a block are compared with the data values of neighboring pixels. Each pixel is compared with its neighboring pixels. In the depicted embodiment, such pixels are not compared with their diagonal neighboring pixels. So, under such a method, corner pixels are analyzed with respect to the two adjacent pixels. Edge pixels that are not corner pixels are compared with three adjacent pixels. All other pixels are, of course, compared with four adjacent pixels. Such comparisons yield values as follows. Pixels having neighbors with the same value are counted as zero for each neighbor and pixels having differing values are counted as one for each neighbor. Such a calculation, based on the block 800 shown in FIG. 8, is as follows. Starting with the upper left corner pixel 801, comparing that pixel with the neighboring pixel 802 just to the right which also has a value of zero, yields a value of zero. Comparing the upper left corner pixel 801 with the neighboring pixel 811 just below which has a value of one, yields a value of one. Thus, the comparison value for pixel 801 is (0+1)=1. Moving to the right, the center top pixel 802 has a comparison value of zero. The right-hand top corner pixel 803 also has a comparison value of zero. Moving to the left-hand side, center row, that pixel 811 has a comparison value of two. The center pixel has a value of two, and so on. Yielding a final comparison value for the entire block 800 as follows: (1+0+0+2+2+1+0+1+1)=8. This value is compared with the total possible comparison values available. Using the depicted method, the total possible values would be "2" for each corner pixel, "3" for each non-corner edge pixel, and "4" for each "central" pixel. Here, that calculates to (4×2)+(4×3)+(1×4)=24. A more generalized way of calculating such total comparison values in an M by N block is as follows.

| | |
|---|---|
| (4) × (2) | one for each of the four corners; |
| +((M − 2) × (3)) + ((N − 2) × (3)) × 2 | the edges excluding the corners; |
| +(M − 2)(N − 2)(4) | the remaining pixels in the block. |

The inventor contemplates that other schemes for calculating comparison values can be employed. For example, the diagonally adjacent pixels can also be included in comparison value analysis. Moreover, the inventor contemplates that other schemes for analyzing a bit plane or its blocks may be used to identify suitable sites for inserting the information into an image. Such methods are known to those having ordinary skill in the art.

Once the comparison values for a block are determined and summed, the sum is divided by the maximum possible summed comparison value for that block. If this resulting value is less than a predetermined threshold value, then the block is suitable for the insertion of information. One example of a suitable threshold value is 0.5. Blocks having threshold values of about 0.5 or less are acceptable insertion sites. Another example of a suitable threshold value is 0.6. Other threshold values may also be used. It is noted that, if the threshold value is made too high, problems with image quality can result in the final image.

Once a suitable block is found, the information sought to be inserted is introduced into the image. Typically, this occurs by the insertion of the information into the suitable block. When large pieces of information (larger than would fit into a single block) must be introduced into an image, the inserted information can be introduced into more than one block. In such cases, other blocks can be located in the bit plane and analyzed for their suitability. Other blocks meeting the threshold would also be available for the introduction of information. In addition, it is contemplated that large pieces of information can be inserted into blocks from different bit planes.

Also, some embodiments can include an adaptive process for analyzing blocks and inserting data. For example, the blocks of an image are analyzed in accordance with a predetermined threshold value; if the image does not contain enough satisfactory blocks to "hide" the data, a new threshold value is automatically tried. This process is repeated until enough satisfactory blocks are "found" in the image, at which point, the information is inserted. The process of block analysis at one threshold value, image assessment, and trial of new threshold values continues until an acceptable threshold value is determined and enough satisfactory blocks become available so that the data sought to be inserted can be introduced successfully into the image.

Once appropriate sites for introducing information into the image are identified, the information is inserted into the bit plane (or bit planes) to generate trial images. The information can be inserted into an image using a variety of techniques. In one example, the data bits of the information are processed together with the data bits of the suitable block(s) of a bit plane (or bit planes). These processed data bits are integrated into the image as a whole, thereby generating the trial image. In one example, each data bit in the suitable block is processed with a corresponding data bit in the information sought to be inserted. This can be accomplished by inputting these data bits into logic gates. For example, the data bit from the block can be processed with a corresponding data bit in a watermark using an exclusive—OR (XOR) circuit. This will result in a trial image including the inserted information.

Figure 9:
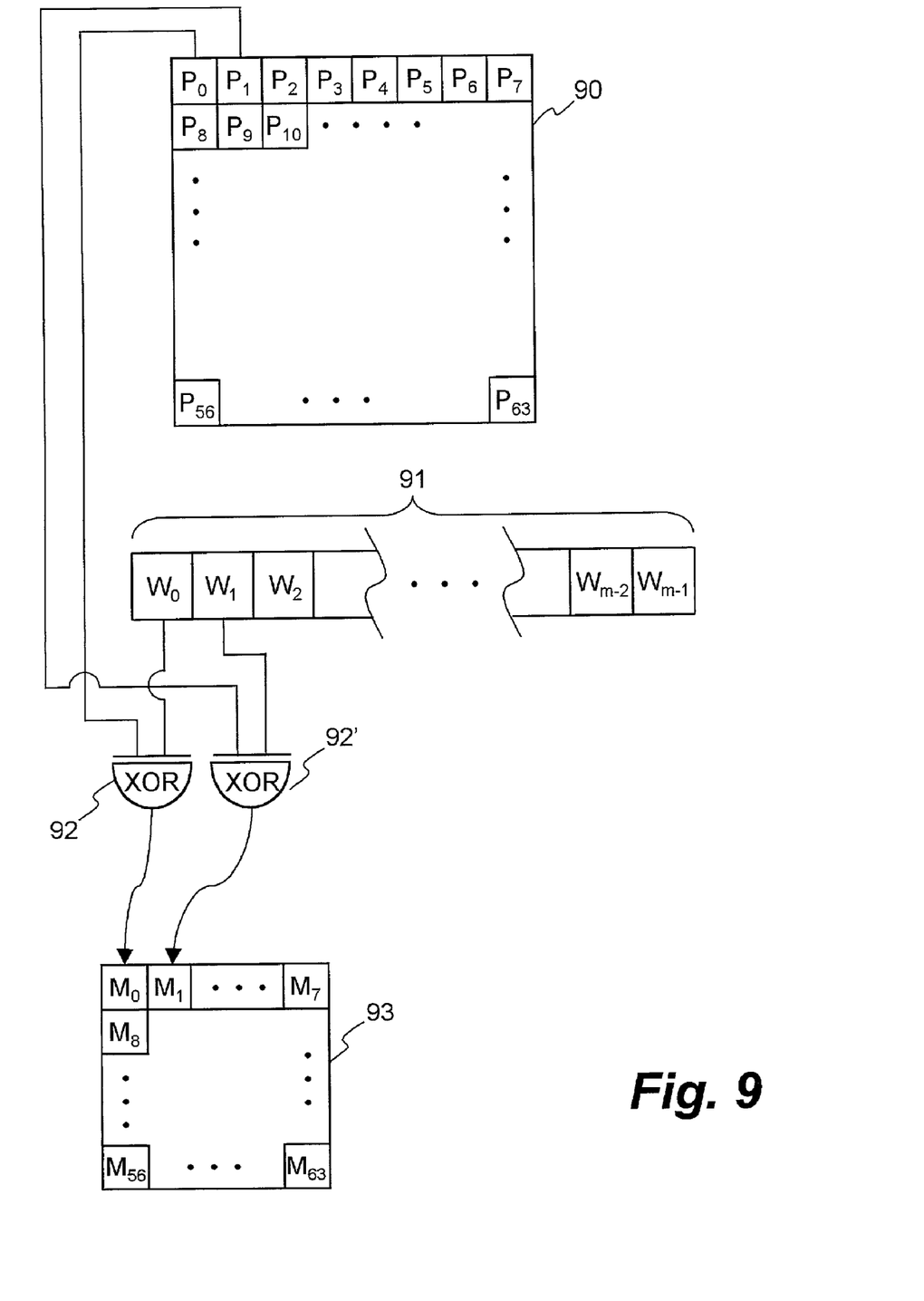
FIG. 9 is a simplified figurative illustration of the insertion of prepared information into a block of a bit plane to generate a modified block in accordance with one embodiment of the present invention.

This example is figuratively illustrated with respect to FIG. 9. A suitable block 90 has been identified using the foregoing methods. The block 90 is representative of an 8 pixel by 8 pixel piece of an image. Because the block 90 is selected from a bit plane of the image, each pixel is represented by a single bit of the corresponding pixel. The block 90 comprises 64 pixel data bits ($P_0$–$P_{63}$). The information sought to be inserted 91 (in this example, watermark data) includes m data bits (identified here as $W_0$–$W_{m-1}$). When m is an integer that is smaller than the number of bits in the block 90, all the bits can be introduced into the single block 90. When m is an integer that is larger than the number of bits in the block 90, additional blocks will be required. The block data bits ($P_0$–$P_{63}$) are processed through image modification circuitry along with the watermark data bits ($W_0$–$W_{m-1}$) to create modified data bits to create a modified block 93. In the depicted example, a first block data bit $P_0$ and a first watermark data bit $W_0$ are processed through an XOR circuit 92 to create a first modified data bit $M_0$. The second block data bit $P_1$ is processed through another XOR circuit 92' with a second watermark data bit $W_1$ to create a second modified data bit $M_1$, and so on. To the extent necessary, each bit ($P_0$–$P_{63}$) of the block 90 can be simultaneously processed with each bit ($W_0$–$W_{m-1}$) in the watermark 91 to form the modified block 93. An embodiment of the invention makes use of SOC architecture to form the image modification directly on the same chip as the sensor. For example, image modification circuitry can include a plurality of XOR gates (e.g., one gate for each bit in a block) as part of its circuitry.

Many other methods of inserting data into the image are known to those having ordinary skill in the art and are contemplated by the inventors. This can include the use of other logical operations (e.g., AND, NAND, OR, or etc.). All that is required is that a modified block be decodable to allow the retrieval of the inserted information.

As described above, by inserting the information into the bit plane(s), a trial image is created. The trial image is then compared with the original image (the image that has no inserted information) to determine the extent of image deterioration caused by the insertion of the information. The purpose of this operation is to insure that the deterioration is minimized, thereby providing a degree of undetectability for the inserted information. One suitable method of comparing the two images is to run a Mean Square Error (MSE) analysis to compare the trial image with the original image. The precise details of an MSE process for comparing two data sequences are well known in the art and will not be described in detail here. If the MSE value is less than a predetermined value, the trial image is satisfactory and the image can be output as a steganographically enhanced image. Moreover, other algorithms for comparing two data sequences can be used to compare trial images with an original image to determine whether the information has been inserted into the a trial image with a satisfactory degree of undetectability.

In the event that the comparison between the trial image and the original image does not meet with the predetermined comparison criteria, then further processing can be used. In one example, another block can be chosen for data insertion. In one embodiment, a new block can be chosen by searching all the available blocks in a bit plane. For example, the new block can be selected by sequentially raster scanning all available blocks in the bit plane and choosing the next satisfactory block. In an alternative approach, instead of choosing another block, a new bit plane can be selected. An example of this process can be illustrated with continued reference to FIG. 6. A fourth bit plane 140 was selected as the initial bit plane. However, the fourth bit plane 140 was found unsuitable for the insertion of a watermark (or steganographic information). Rejecting the fourth bit plane 140 permits another bit plane to be chosen. It is advantageous to choose a bit plane between the fourth bit plane 140 and the least significant bit plane 180. In the depicted 8-bit embodiment, a fifth bit plane 150 can be chosen. In the same way that the previous fourth bit plane 140 was analyzed, the pixel blocks of the fifth bit plane 150 are analyzed to determine suitable bit plane for insertion. If, as with the fourth bit plane 140, the fifth bit plane 150 proves unsatisfactory, a sixth bit plane 160 can be chosen. The sixth bit plane 160 is subject to analysis and acceptance or rejection, as with the fourth and fifth bit planes. Typically, as soon as an acceptable bit plane is found, the image is inserted and the process ceases. However, if no suitable bit plane is found, the image itself may be considered unsatisfactory for insertion of the information.

Additionally, several bit planes can be analyzed at the same time. Several bit planes are selected, appropriate insertion sites are located, information is inserted at the sites, and trial images are generated. Each of these trial images is compared to the original image and the image producing the most satisfactory results is chosen as the final steganographically enhanced image.

Figure 10:
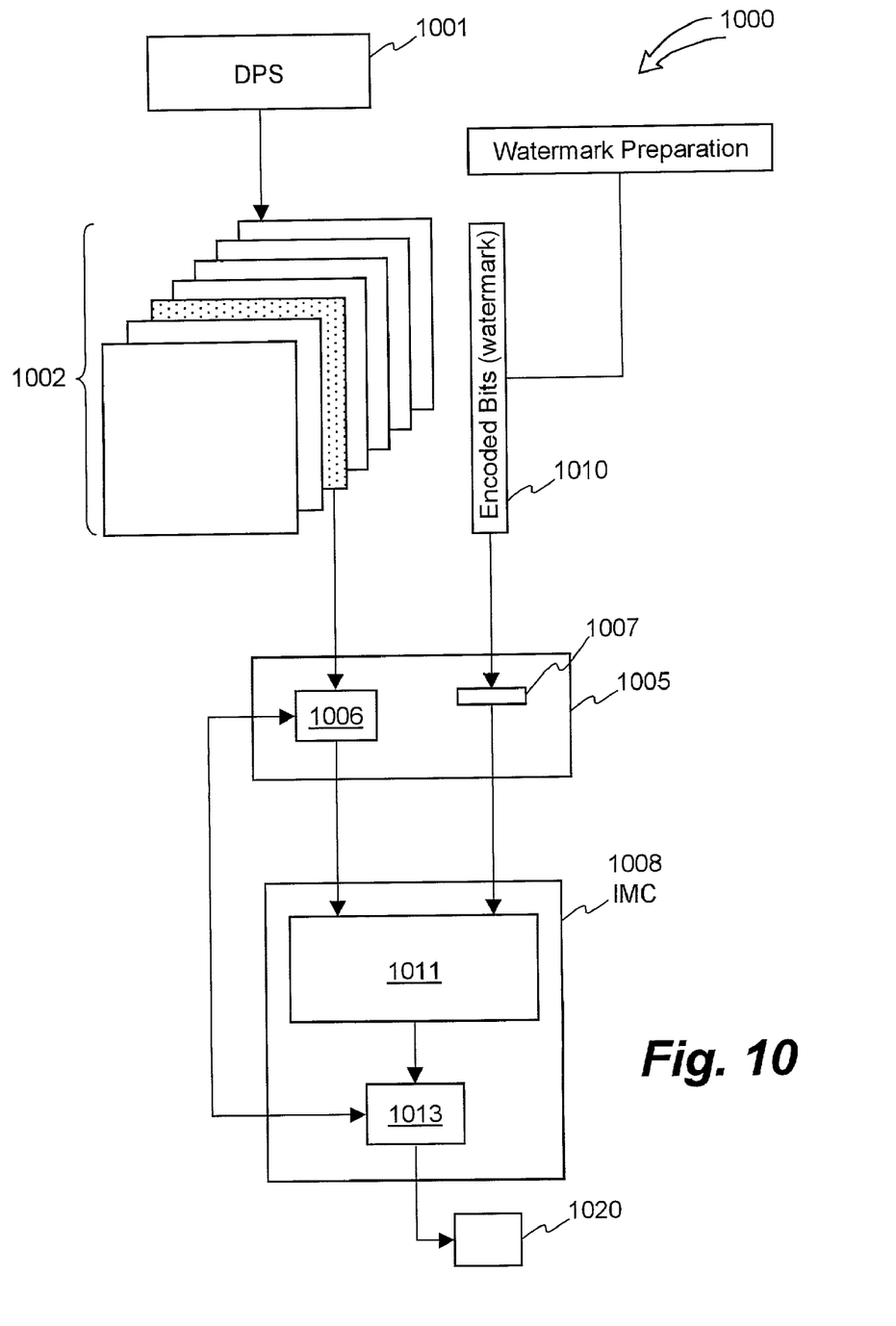
FIG. 10 is a simplified block diagram illustrating the principles of operation for a system embodiment of the present invention.

FIG. 10 depicts a system 1000 for the automatic steganographic insertion of information into images. The system 1000 is preferably implemented as a single integrated circuit (chip), namely, a system on a chip (SOC). The image is created, for example, with a digital pixel sensor (DPS) 1001 which outputs an original image 1002 into memory (MEM) 1005. The original image 1002 is stored in memory addresses 1006 of the memory (MEM) 1005. Also, information sought to be inserted 1010 (including but not limited to watermarks, messages, or other data) is prepared and stored in memory locations 1007 of the memory (MEM) 1005.

The original image 1002 and the information sought to be inserted 1010 are processed by image modification circuitry (IMC) 1008 which can include controller circuitry, microprocessors, comparator circuitry, logic gates, and/or ASICs. The processing creates a trial image 1011. Comparison circuitry 1013 of the IMC 1008 compares the trial image 1011 with the original image 1002 (typically stored in memory addresses 1006 of the MEM 1005) to determine if the trial image 1011 provides a satisfactory image. In the case where the trial images 1011 are unsatisfactory, a different bit plane is received from MEM and processed as described hereinabove. Once a satisfactory trial image 1011 is formed, it can be output as a steganographically enhanced image 1020.

Figure 11:
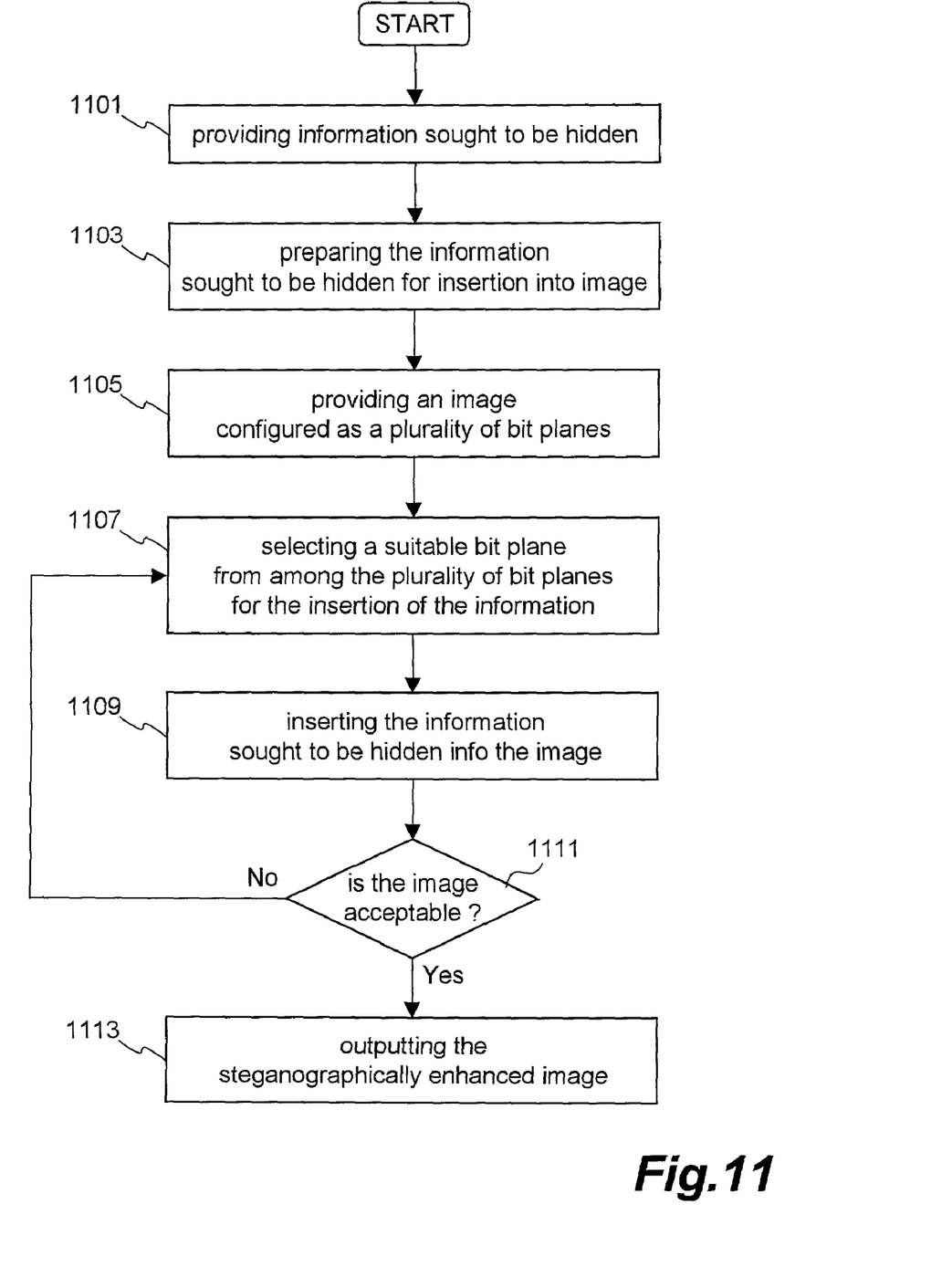
FIG. 11 is a flow diagram describing a suitable method embodiment for accomplishing automatic steganographic insertion of information into an image in accordance with one embodiment of the present invention.

One method embodiment recapitulating certain aspects of the invention is set forth in the flow diagram of FIG. 11. FIG. 11 depicts a method for hiding information in images. The method includes the operations of providing information sought to be hidden (block 1101). As explained hereinabove, the information can be any digital information including, but not limited to, watermarks, messages, data, images, or other information. The information is then prepared for insertion into images (block 1103). Such preparation can include encoding the information such that it has a format compatible with the format of the image where the information is to be inserted. Such preparation can include encryption or scrambling of the information prior to insertion into the image. Such encryption can be particularly useful where the information includes message information, although it is not so limited. Another operation comprises providing an image configured as a plurality of bit planes (block 1105). Such images can comprise any number of bit planes configured in a variety of formats. One satisfactory image is configured in an 8-bit gray code format. Another operation is selecting at least one suitable bit plane from among the plurality of bit planes (block 1107). Typically, this includes selecting a bit plane that is not a LSB or a MSB. Once the bit plane is chosen, a suitable insertion site from the selected bit plane is identified in accordance with some predetermined threshold criteria. For example, one or more blocks are identified as suitable sites for the insertion of the prepared information. The information is then inserted (block 1109) into an appropriate insertion site and the resulting trial image is analyzed (block 1111). If the trial image is unsatisfactory, another bit plane is selected and further trial image created and analyzed until a suitable trial image is created or the image is disregarded as unsuitable. Once a satisfactory trial image is realized, insertion is conducted to create a final steganographically enhanced image. This image can then be output (block 1113).

The present invention has been particularly shown and described with respect to certain preferred embodiments and specific features thereof. However, it should be readily apparent to those of ordinary skill in the art that various changes and modifications in form and detail may be made without departing from the spirit and scope of the invention as set forth in the appended claims. For example, although the invention as disclosed is implemented entirely with hardware components, many of the functions and components described herein can be implemented with software. Further, reference in the claims to an element in the singular is not intended to mean "one and only one" unless explicitly stated, but rather, "one or more". Furthermore, the examples provided herein are intended to be illustrative rather than limiting. The inventions illustratively disclosed herein can be practiced without any element which is not specifically disclosed herein.

What is claimed is:

1. A method for hiding information in images, the method comprising the operations of:
   providing information sought to be hidden;
   preparing the information sought to be hidden for insertion into an image;
   providing image data configured as a plurality of bit planes wherein one of the bit planes defines a most significant bit plane and another one of the bit planes defines a least significant bit plane;
   selecting a suitable bit plane from among the plurality of bit planes for the insertion of the information; and
   inserting the information sought to be hidden into the image,
   wherein the operation of selecting a suitable bit plane comprises:
      selecting an initial bit plane that is not the most significant bit plane and that is not the least significant bit plane;
      introducing the information sought to be hidden into a suitable site in the initial bit plane and generating a modified image;
      determining if the modified image is of satisfactory quality compared to an unmodified image; and
      if the modified image is of satisfactory quality, inserting the information into the image, and
      if the modified image is not of satisfactory quality, choosing another bit plane and repeating the steps of selecting, introducing, and determining until an image of satisfactory quality is obtained; and
      if an image of satisfactory quality can not be obtained, discarding the image as unsatisfactory for containing the information sought to be hidden.

2. A method as in claim 1, wherein the operation of inserting the information sought to be hidden into the image comprises inserting the information into the suitable bit plane.

3. A method as in claim 1, wherein the operation of preparing the information sought to be hidden for insertion into an image comprises encoding the information.

4. A method as in claim 3, wherein the operation of preparing the information further comprises the step of encrypting the information.

5. A method as in claim 4, wherein the information comprises watermark information.

6. A method as in claim 4, wherein the information comprises messages.

7. A method as in claim 3, wherein the information comprises watermark information.

8. A method as in claim 3, wherein the information comprises messages.

9. A method as in claim 1, wherein the operation of providing an image configured as a plurality of bit planes comprises providing an image configured in at least eight bit planes numbered sequentially from the most significant bit plane to the least significant bit plane.

10. A method as in claim 9, wherein the operation of selecting a suitable bit plane from among the at least eight bit planes comprises selecting a bit plane from among the group of bit planes consisting of the fourth, fifth, sixth, and seventh bit planes.

11. A method as in claim 9, wherein the operation of selecting a bit plane from among the at least eight bit planes comprises selecting a fourth bit plane.

12. A method as in claim 1, wherein the operation of selecting a suitable bit plane and inserting the information comprise,
   selecting more than one of the bit planes;
   introducing the information into each selected bit plane to create a series of trial images; and
   evaluating each of the trial images using an adaptive algorithm that compares and evaluates the image quality of the trial images with respect to an original image to select a suitable image plane.

13. A method as in claim 12, wherein the operation of introducing the information into each selected bit plane to create a series of trial images comprises:
   dividing the selected bit plane into at least one block of pixel;
   analyzing at least one block of pixels to determine if it offers a suitable site for the introduction of said information into the selected bit plane; and
   introducing the information into the at least one block of pixels to create the series of trial images.

14. A method for hiding information in images, the method comprising:
   providing an image sensor having a digital pixel sensor, analog to digital conversion circuitry, image conversion circuitry, and memory all formed on a single chip;
   providing information sought to be hidden;
   preparing the information sought to be hidden for insertion into an image;
   the image sensor providing at least one original image, each original image comprising image data configured as a plurality of bit planes, wherein one of the bit planes defines a most significant bit plane and another one of the bit planes defines a least significant bit plane;
   selecting a suitable bit plane for the insertion of the information sought to be hidden; and
   inserting the information sought to be hidden,
   wherein the operation of selecting a suitable bit plane comprises:
      selecting an initial bit plane that is not the most significant bit plane and that is not the least significant bit plane;
      introducing the information sought to be hidden into a suitable site in the initial bit plane and generating a modified image,
      determining if the modified image is of satisfactory quality compared to an unmodified image; and
      if the modified image is of satisfactory quality, inserting the information into the image, and
      if the modified image is not of satisfactory quality, choosing another bit plane and repeating the steps of selecting, introducing, and determining until an image of satisfactory quality is obtained; and
      if an image of satisfactory quality can not be obtained, discarding the image as unsatisfactory for containing the information sought to be hidden.

15. The method of claim 14, wherein the operation of providing the information sought to be bidden includes encoding the information in an appropriate format and encrypting the information.

16. A single-chip digital image sensor comprising:
   a substrate having formed thereon a digital sensor array;
   the digital sensor array including a plurality of light sensitive digital pixel sensors which output digital signals corresponding to an image, the digital signals having digital values corresponding to the image;

at least one memory for storing the digital values provided by the digital sensor array as a plurality of bit planes and for storing digital information sought to be inserted into the image, wherein one of the bit planes defines a most significant bit plane and another one of the bit planes defines a least significant bit plane, and image modification circuitry, which receives from memory the plurality of bit planes corresponding to the image and the digital information sought to be inserted into the image, and analyzes the bit planes to determine a suitable site for inserting the information sought to be inserted, and which inserts the information into the suitable site to form a steganographically enhanced image, wherein the image modification circuitry selects an initial bitplane that is not the most significant bit plane and that is not the least significant bit plane, the information sought to be hidden is introduced into a suitable site in the initial bit plane and a modified image is generated, the image modification circuitry further determines if the modified image is of satisfactory quality compared to an unmodified image, such that if the modified image is of satisfactory quality, the image modification circuitry causes the information to be inserted into the image, and if the modified images not of satisfactory quality, the image modification circuitry chooses another bit plane and the operations of selecting, introducing and determining are repeated until an image of satisfactory quality is obtained, and the image modification circuitry discards the image as unsatisfactory for containing the information, sought to be hidden if an image of satisfactory quality cannot be obtained.

\* \* \* \* \*